(12) United States Patent
Morris et al.

(10) Patent No.: US 12,045,850 B2
(45) Date of Patent: Jul. 23, 2024

(54) METHOD AND SYSTEM FOR AUTOMATED APPLICATION OF FUEL DISCOUNTS FROM CARRIERS TO CONTRACTED DRIVERS

(71) Applicant: Onramp Payments, Inc., Vergennes, VT (US)

(72) Inventors: Michael Morris, Panton, VT (US); Natalya Elkanova, San Francisco, CA (US); Jeremie Myhren, Roscoe, IL (US)

(73) Assignee: Onramp Payments, Inc., Vergennes, VT (US)

( * ) Notice: Subject to any disclaimer, the term of this patent is extended or adjusted under 35 U.S.C. 154(b) by 0 days.

(21) Appl. No.: 17/880,875

(22) Filed: Aug. 4, 2022

(65) Prior Publication Data

US 2023/0037766 A1    Feb. 9, 2023

Related U.S. Application Data

(60) Provisional application No. 63/293,859, filed on Dec. 27, 2021, provisional application No. 63/293,858, filed on Dec. 27, 2021, provisional application No. 63/293,857, filed on Dec. 27, 2021, provisional application No. 63/229,347, filed on Aug. 4, 2021.

(51) Int. Cl.
| G06Q 30/00 | (2023.01) |
| G06Q 20/32 | (2012.01) |
| G06Q 20/40 | (2012.01) |
| G06Q 30/0207 | (2023.01) |
| G06Q 50/40 | (2024.01) |

(52) U.S. Cl.
CPC ....... *G06Q 30/0236* (2013.01); *G06Q 20/325* (2013.01); *G06Q 20/4014* (2013.01); *G06Q 20/4015* (2020.05); *G06Q 30/0222* (2013.01); *G06Q 50/40* (2024.01)

(58) Field of Classification Search
None
See application file for complete search history.

(56) References Cited

U.S. PATENT DOCUMENTS

2005/0261916 A1* 11/2005 McCall ............. G06Q 30/0601
                                                     705/17
2008/0249916 A1* 10/2008 Kirch .................... G06Q 50/06
                                                     705/37

(Continued)

*Primary Examiner* — Matthew T Sittner
(74) *Attorney, Agent, or Firm* — Liang & Hennessey LLP; Brian Hennessey

(57) ABSTRACT

Receiving, at a server, an identifier from a user to authorize fuel payment at a fuel station. Associating the identifier with a carrier, the carrier being entitled to a fuel discount at the fuel station. Authorizing the fuel station to provide fuel to the user with the fuel discount, which may be variable. The identifier may be received from a mobile application, a company credit card, a personal credit card, a virtual credit card, and/or an onboard electronic logging device (ELD). The authorizing of the fuel station to provide fuel to the user with the fuel discount may be limited by an amount and/or a type of fuel. A system is provided that includes a receiver module, and a server, and a transmitter module. A non-transitory computer-readable medium storing a program for operating a fuel discount sharing application is provided.

16 Claims, 5 Drawing Sheets

(56) References Cited

U.S. PATENT DOCUMENTS

| | | | | |
|---|---|---|---|---|
| 2008/0280732 | A1* | 11/2008 | Jones | B60R 5/00 |
| | | | | 482/52 |
| 2011/0178883 | A1* | 7/2011 | Granbery | G06Q 20/40 |
| | | | | 705/16 |
| 2012/0317628 | A1* | 12/2012 | Yeager | G06Q 20/3278 |
| | | | | 726/5 |
| 2013/0013431 | A1* | 1/2013 | Fansler | G07F 13/025 |
| | | | | 705/18 |
| 2014/0305537 | A1* | 10/2014 | Lian | B60S 5/02 |
| | | | | 141/237 |
| 2014/0315485 | A1* | 10/2014 | Marie | H04L 63/0428 |
| | | | | 455/556.1 |
| 2015/0088613 | A1* | 3/2015 | Pierce, Jr. | G06Q 30/0206 |
| | | | | 705/7.35 |
| 2015/0170149 | A1* | 6/2015 | Sharma | G06Q 20/385 |
| | | | | 705/44 |
| 2016/0171477 | A1* | 6/2016 | Elder | G06Q 20/3224 |
| | | | | 705/44 |
| 2016/0364718 | A1* | 12/2016 | Betancourt | G06Q 20/3278 |
| 2017/0148113 | A1* | 5/2017 | Yasko | G06Q 40/04 |
| 2018/0096326 | A1* | 4/2018 | Szeto | G06Q 50/06 |
| 2019/0139106 | A1* | 5/2019 | Onodera | G06Q 30/0278 |
| 2020/0349496 | A1* | 11/2020 | Irwin | G06Q 10/083 |

* cited by examiner

METHOD AND SYSTEM FOR AUTOMATED APPLICATION OF FUEL DISCOUNTS FROM CARRIERS TO CONTRACTED DRIVERS

CROSS-REFERENCE TO RELATED APPLICATIONS

The present application claims priority to U.S. Provisional Patent Application No. 63/229,347, filed Aug. 4, 2021, U.S. Provisional Patent Application No. 63/293,857, filed Dec. 27, 2021, U.S. Provisional Patent Application No. 63/293,858, filed Dec. 27, 2021, and U.S. Provisional Patent Application No. 63/293,859, filed Dec. 27, 2021, each of which is incorporated by reference in its entirety.

BACKGROUND OF THE INVENTION

1. Field of the Invention

The invention relates to fuel payments by contracted drivers, and in particular to methods and systems for application of fuel discounts from carriers to contracted drivers.

2. Description of the Related Art

Trucking companies (also referred to as carriers) often negotiate fuel discounts with large fueling station networks (also referred to as merchants). For example, large trucking companies have negotiated fuel discounts at major truckstops and can receive approximately $0.40 discount per gallon of diesel compared to the retail price. Trucking companies typically enable their drivers to access these discounts using a company credit card.

Sometimes large trucking companies act as a broker and send loads to smaller trucking companies. In some cases, such large trucking companies may realize substantial percentages of their revenue from loads they broker rather than loads being hauled with their own drivers and trucks. Trucking companies also often use independent truckers on a regular basis to cover variable requirements and to reduce overhead expenses.

It would be advantageous for trucking companies to be able to share their fuel discounts with independent truckers operating for their benefit.

SUMMARY OF THE INVENTION

A method for transferring fuel discounts is provided via one or more of three methods: 1) by providing the driver with a contactless or physical credit card; 2) by "linking" an existing card the driver already has in their wallet to the trucking company's discount program; and/or 3) by integrating with the fuel pump Point of Sale ("POS") and having the driver input a code when they fill up.

Another exemplary embodiment of the present technology provides a mobile application (app) for an independent trucker (driver) to download to a mobile device. The mobile app enables the driver to make secure, contactless payments for fuel and/or other items at a fuel station retail outlet (truck stop) of a fuel station network (merchant). Payments made using the app may benefit from a collective discount from the merchant to a carrier when the driver is hauling a load for the carrier.

Alternatively, the driver may access the benefit of the fuel discount via a company credit card, a personal credit card, a virtual credit card, and/or an onboard electronic logging system (also referred to as an electronic logging device or ELD). The ELD may be integrated with a transportation management system (TMS). Some information usually associated with a retail fuel purchase by a driver include a driver identifier (also referred to as a driver pin), a trailer identifier, and an odometer reading. Some or all of this information may be obtained directly from the app or ELD. Likewise, eligibility determinations including partial eligibility, for instance based on amount or type of fuel, may be imposed by the app or ELD on purchases made using the exemplary embodiment. Exemplary embodiments of the present technology may also leverage the existing ELD system to implement a fuel discount transfer feature.

The contactless features of the present technology may be implemented by a Bluetooth system, mobile cellular network, WiFi, or any other appropriate communication technology. The present technology may also be implemented via a direct relationship with a credit or debit card issuer to facilitate the discounting of payments. Additionally, the amount of discounting applied to any particular transaction may be variable based on various factors. Additionally, location information obtained from a GPS or other location system may be utilized to confirm the truck being fueled is eligible for the fuel discount being applied.

A method is provided for receiving, at a server, an identifier from a user to authorize a fuel payment at a fuel station. The method also includes associating, by the server, the identifier with a carrier, the carrier being entitled to a fuel discount at the fuel station. The method further includes authorizing, by the server, the fuel station to provide fuel to the user with the fuel discount.

In exemplary methods according to the present technology, the user is a truck driver contracting with the carrier to haul a load for the carrier. Exemplary methods further include authorizing other payments at the fuel station.

The identifier may be received at the server from a mobile application, a company credit card, a personal credit card, a virtual credit card, and/or an onboard electronic logging device (ELD).

When the identifier is received at the server from the mobile application, the mobile application may be downloaded by the user to a mobile device. A driver identifier, a trailer identifier, and an odometer reading may be received at the server from the mobile application.

When the identifier is received at the server from the ELD, the ELD may be integrated with a transportation management system (TMS). A driver identifier, a trailer identifier, and an odometer reading may be received at the server from the ELD.

The authorizing of the fuel station to provide fuel to the user with the fuel discount may be limited by an amount and/or a type of fuel. The fuel discount may be variable.

The identifier may be received from the user in a secure, contactless, transmission. The transmission may be by a Bluetooth system, a mobile cellular network, and/or a WiFi network.

The server may be operated by a credit card issuer and/or a debit card issuer, or may be electronically coupled to a further server operated by the credit card issuer and/or the debit card issuer.

The method may include receiving, at the server, location information associated with a truck being operated by the user. The server may authorize the fuel station to provide the fuel to the user with the fuel discount only if the location information corresponds to a location at the fuel station associated with a pump.

The fuel station may provide the fuel to the user with an additional discount based on a utilization rate of pumps available at the fuel station.

A system is provided that includes a receiver module configured to receive an identifier from a user to authorize a fuel payment at a fuel station, and a server configured to receive the identifier from the receiver module and associate the identifier with a carrier. The carrier may be entitled to a fuel discount at the fuel station, and a transmitter module may be configured to send an authorization from the server to the fuel station to authorize fueling of the user with the fuel discount.

The system may operate to authorize other payments at the fuel station.

The identifier may be received by the receiver module from a mobile application, a company credit card, a personal credit card, a virtual credit card, and/or an onboard electronic logging device (ELD).

A non-transitory computer-readable medium storing a program for operating a fuel discount sharing application is provided. The program includes instructions that, when executed by a processor, causes a processor to perform a method according to the present exemplary technology.

BRIEF DESCRIPTION OF THE DRAWINGS

The invention is described in more detail with reference to the accompanying drawings, in which only preferred embodiments are shown by way of example. In the drawings.

DETAILED DESCRIPTION

The exemplary method provided herein enables the provision of a fuel discount from a carrier/broker to an independent driver. Exemplary methods and systems include some or all of the following steps:

1. The system receives fuel discount program information from a carrier.
2. The system queries a merchant database to retrieve a merchant identifier for merchants with whom the carrier has a fuel discount program or arrangement.
3. The system configures a fuel discount program identifier for that carrier, using the merchant identifier for the merchants where the carrier has a fuel discount program.
4. The carrier brokers a load to a truck driver.
5. The truck driver receives an email or text link with fuel discount program information.
6. The truck driver clicks on a link and is directed to a landing page or a mobile application.
7. The truck driver inputs existing payment card information (including account number and expiration date) from any major payment network into a form.
8. The truck driver taps 'submit'.
9. The form relays the payment card information to the system server.
10. The system sends the payment card information to a payment network that the payment card uses to process transactions, along with the merchant identifiers where transactions should be 'spotted' on the payment network.
11. Payment card is tokenized and the system stores the token, so that account number and expiration date do not need to be stored, thus avoiding PCI compliance issues. PCI compliance issues may include: 1. inadvertent storage of Sensitive Authorization Data (SAD); 2. liability for stored payment card data; and 3) attractiveness as a cyber crime target due to possession of payment card data.
12. The system enrolls the payment card in its fuel discount program tracking system.
13. The truck driver swipes the payment card at a merchant where the carrier has a fuel discount program.
14. The payment network forwards a live transaction for the payment card, along with the merchant identifier where the transaction took place
15. The system matches the merchant identifier with the fuel discount program identifier to see if the transaction qualifies for a fuel discount.
16. If the transactions qualifies for a fuel discount, then the system issues a statement credit to the card or establishes a credit balance for the card.

Figure 1:
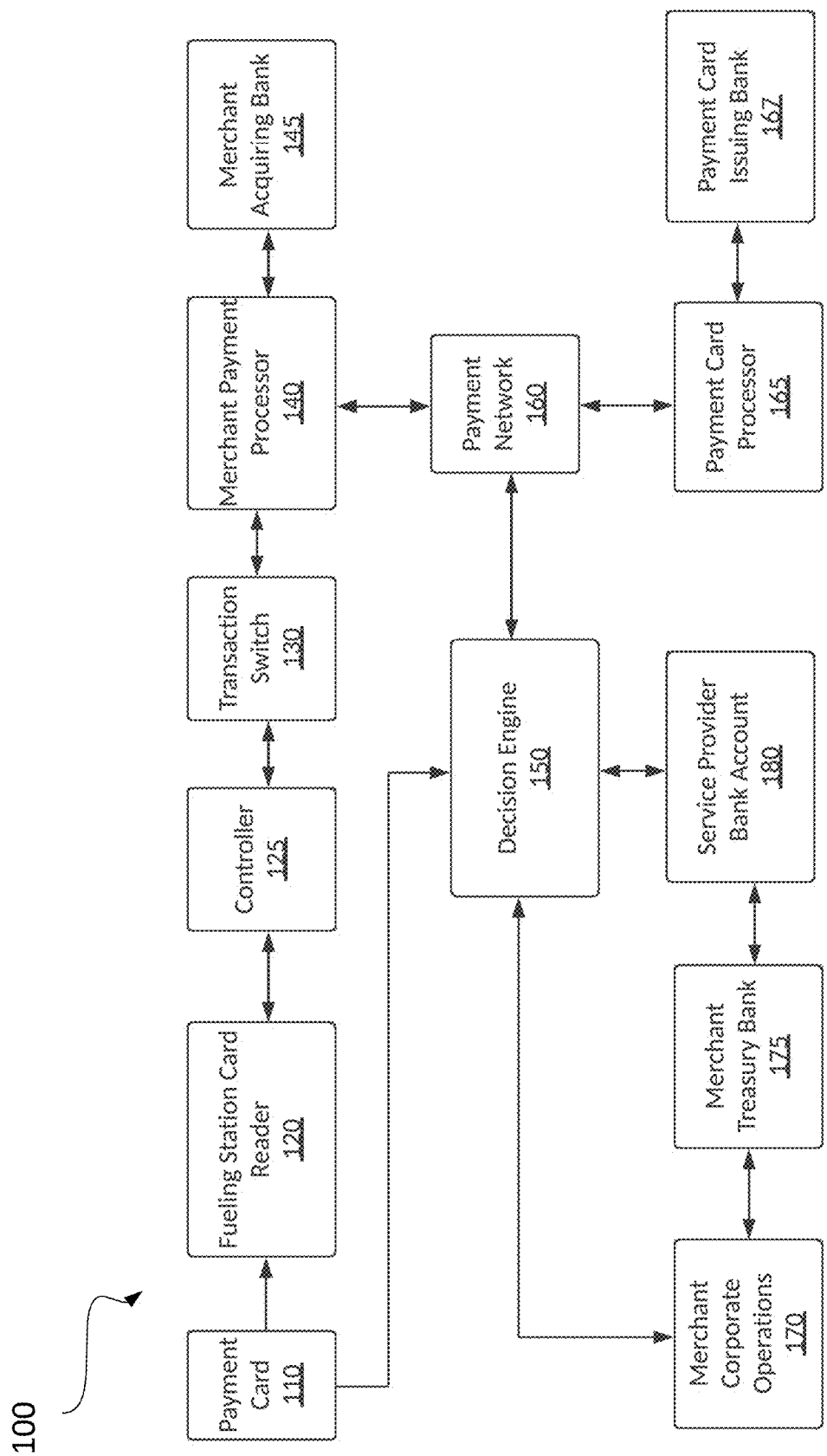
FIG. 1 is a diagram illustrating a system for implementing the proposed method including a decisioning engine according to the exemplary technology.

FIG. 1 is a diagram illustrating system 100 for implementing the proposed method including a decisioning engine (also referred to as a matching engine) according to the exemplary technology. FIG. 1 shows payment card 110 which may be used by a truck driver, and which may be registered with decisioning engine 150 in steps 5-12 discussed above. Information associated with a payment card and stored in memory associated with decisioning engine 150 may include carrier (or trucking company) name, discounted price per gallon (which may be a specific carrier rate for the truck driver, or a carrier's negotiated rate), expected truck driver distance to be traveled (for example route information), truck driver route timeframe (route information), qualifying fuel type, price per kWh in the case of electric or hybrid vehicles (a carrier rate for Driver, or a carrier's negotiated rate). Fuel as discussed herein may alternatively be electricity.

Payment card 110 may be used at fuel station card reader 120 to pay for fuel. Fuel station card reader 120 communicates with controller 125, which operates the fuel pump. Once fueling is complete, or prior to fueling in an authorization mode, controller 125 communicates to transaction switch 130. Transaction switch 130 may be a merchant Point of Sale system. Transaction switch 130 communicates to merchant processor 140, which may for instance be fuel retail operation payment processor. Merchant processor 140 may bilaterally communicate with merchant acquiring bank 145. Merchant processor 140 also communicates with payment network 160, which may for instance be a global payment processor (for example Visa™ and Mastercard™). Payment network 160 may bilaterally communicate with decisioning engine 150, and also bilaterally communicate with payment card processor 165. Payment card processor 165 may communicate with payment issuing bank 167. Decisioning engine 150 may communicate with merchant corporate operations 170, and also with service provider bank account 180. Both merchant corporate operations 170 and service provider bank account 180 may communicate with merchant treasury bank 175.

System 100 may generate and store, in decisioning engine 150 or memory associated with or coupled to decisioning engine 150, an enrolled payment card account number, qualifying merchant identifiers (also referred to as MIDS), augmented transaction information (for example, a receipt scan, a pump scan, and/or a charger scan). The merchant, which may be a truck stop or other fueling station, may record and/or transmit the following information: merchant name or merchant identifier; transaction amount; transaction time; transaction location; price per gallon (retail); number of gallons or liters pumped; type of fuel purchased; other products purchased; kWh dispensed; price per kWh; and/or payment card account number used for the fuel purchase.

Figure 2:
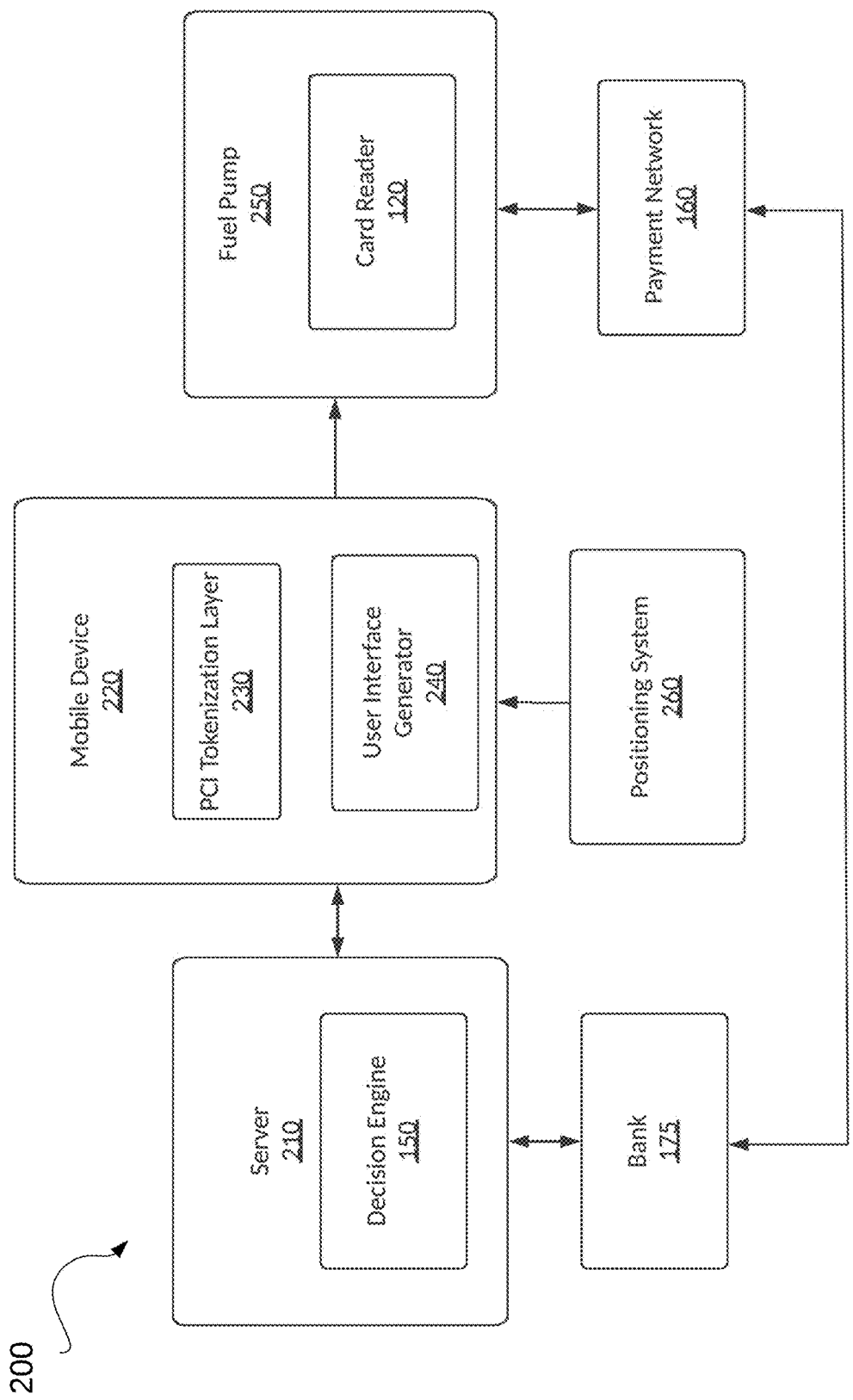
FIG. 2 is a diagram illustrating a mobile application system for implementing the proposed method including a matching or decisioning engine according to the exemplary technology.

FIG. 2 is a diagram illustrating mobile application system 200 for implementing the proposed method including decisioning engine 150 operating on server 210. Server 210 bilaterally communicates with bank 175 to authorize or decline transactions according to the logic and information input into decisioning engine 150. Server 210 also communicates bilaterally with mobile device 220 which may be via a mobile phone carrier service, a WiFi network, or any other appropriate communication technology. Mobile device may include a specialized application (app) for interacting with server 210, or may do so via a web browser. Mobile device 220 may generate one or more user interfaces using user interface generator 240, which may include variations of the user interfaces shown in FIG. 4. Mobile device 220 may also utilize PCI tokenization layer 230 (also referred to as a tokenization layer) for securing and anonymizing communications with server 210 and fuel pump 250. Mobile device 220 may communicate with fuel pump 250 when a truck driver is at the pump and ready to fuel up. Fuel pump 250 may also include card reader 120 which may operate to communicate with mobile device 220 or may operate as an alternative to mobile device 220. Fuel pump 250 may communicate with payment network 160 to authorize fueling and to register a transaction to purchase fuel. Payment network 160 may communicate with bank 175.

Figure 3:
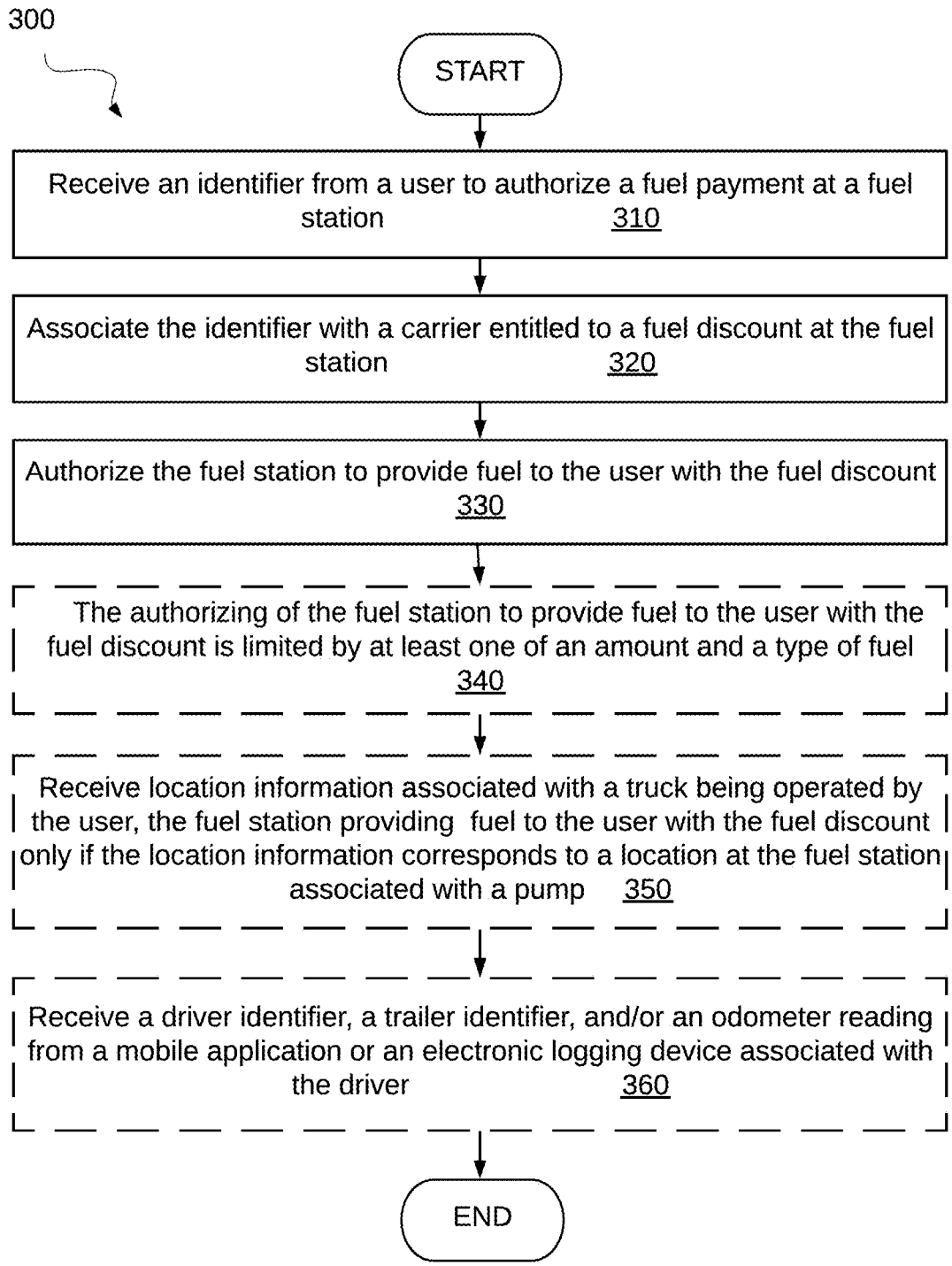
FIG. 3 is a flowchart illustrating a method according to an exemplary embodiment of the present invention.

FIG. 3 is a flow chart illustrating method 300 according to the present invention. In FIG. 3, optional steps in method 300 are shown in dotted boxes. The flow in method 300 flows from the start oval to operation 310, which indicates to receive an identifier from a user to authorize a fuel payment at a fuel station. From operation 310, the flow in method 300 proceeds to operation 320, which indicates to associate the identifier with a carrier entitled to a fuel discount at the fuel station. From operation 320, the flow in method 300 proceeds to operation 330, which indicates to authorize the fuel station to provide fuel to the user with the fuel discount. From operation 330, the flow in method 300 proceeds to optional operation 340, which indicates to limit the authorization of the fuel station to provide fuel to the user with the fuel discount by an amount and/or a type of fuel. From optional operation 340, the flow in method 300 proceeds to optional operation 350, which indicates to receive location information associated with a truck being operated by the user. Optional operation 350 further indicates that the fuel station provides fuel to the user with the fuel discount only if the location information corresponds to a location at the fuel station associated with a pump. From optional operation 310, the flow in method 300 proceeds to optional operation 320, which indicates to receive a driver identifier, a trailer identifier, and/or an odometer reading from a mobile application or an electronic logging device associated with the driver. From optional operation 360, the flow in method 300 proceeds to the end oval.

Figure 4:
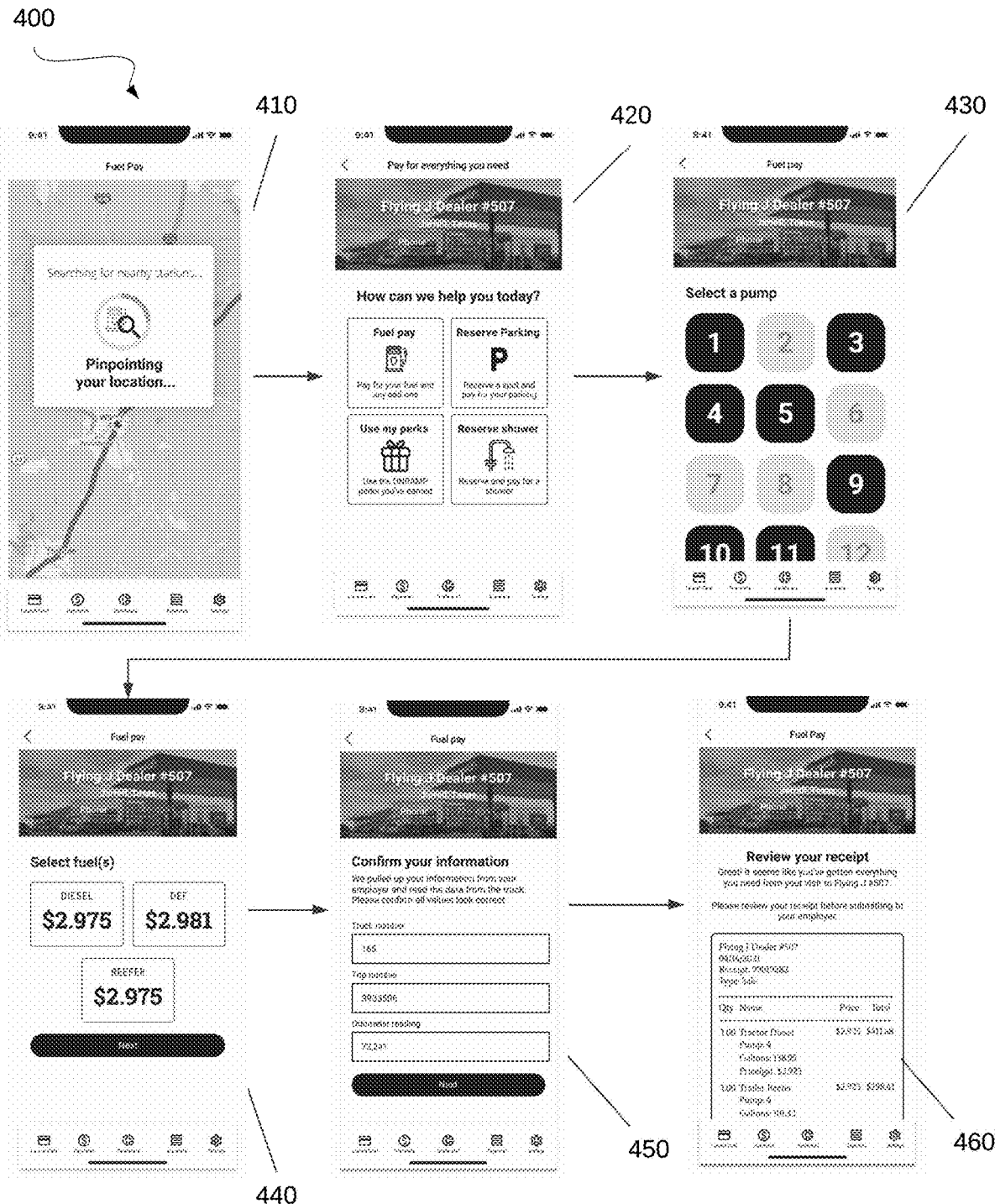
FIG. 4 is a series of exemplary mobile application screenshots for performing an exemplary method according to the present invention.

FIG. 4 is series 400 of exemplary mobile application screenshots for performing an exemplary fuel purchase transaction. according to the present invention. Series 400 begins with fuel pay map screen 410, which indicates a location of the mobile device and searches for nearby fueling stations. Upon selection of a fueling station or moving the mobile device within a geo-fenced location associated with the fueling station, offer screen 420 is displayed to the user, and shows various offerings to the user. For example, offer screen 420 may include options to pay for fuel, reserve parking, use loyalty points earned via the app or otherwise, and/or reserve a shower. Other offerings are also possible. If the user selects fuel pay on offer screen 420, or alternatively moves to a location directly adjacent to or within a narrow geo-fence of a pumping area, the mobile application may then display pump selection screen 430 to the user. The user may then select from a number of pumps available, and may drive to that pump. The mobile application may then display the different fuels and prices available at the selected pump in fuel selection screen 440. After selecting the type of fuel on fuel selection screen 440, the mobile application may then display information confirmation screen 450.

Figure 5:
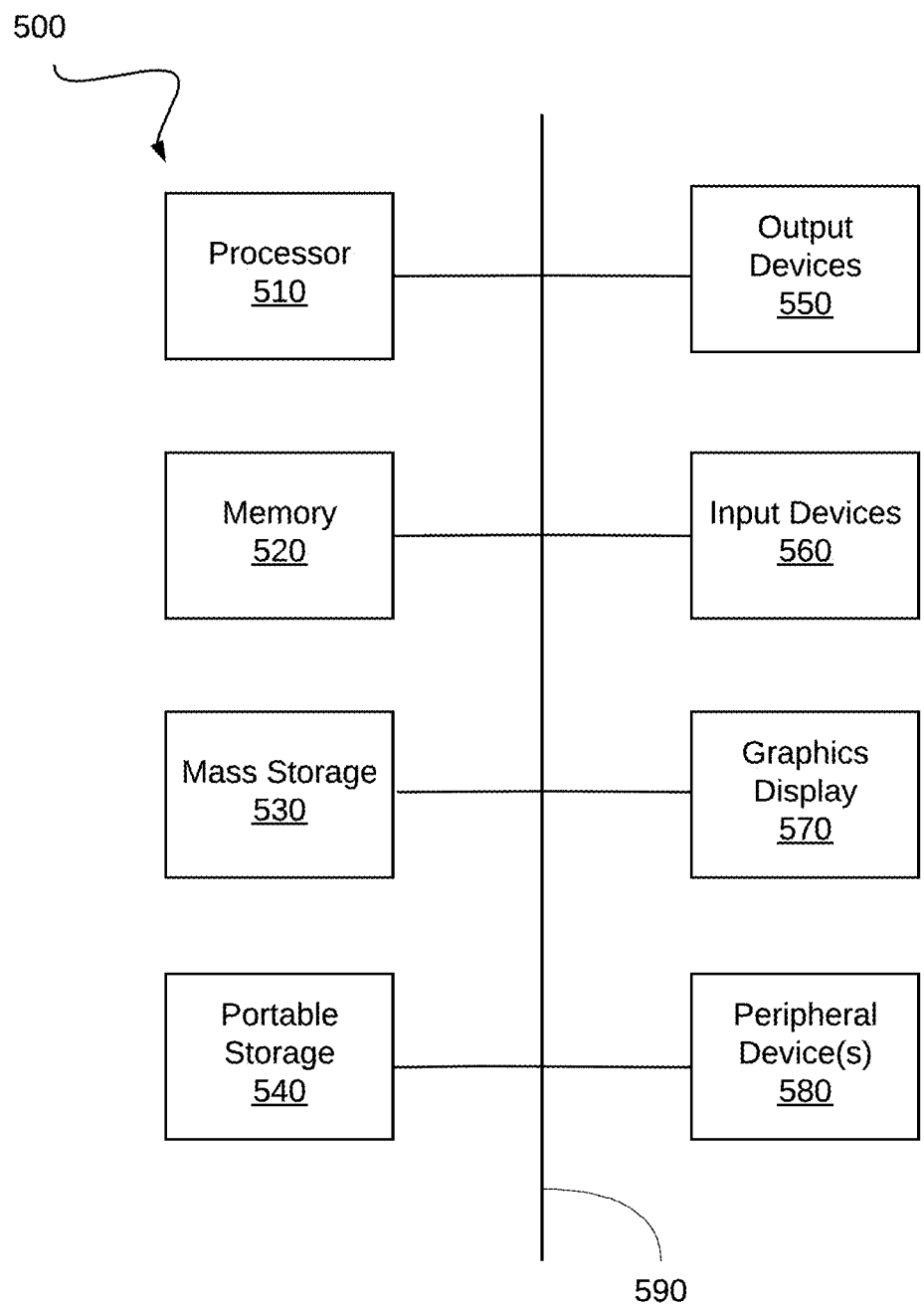
FIG. 5 is a schematic diagram of computing system used in an exemplary embodiment of the present invention.

FIG. 5 is a schematic diagram of computing system used in an exemplary embodiment of the present invention. FIG. 5 illustrates exemplary computing system 500, hereinafter system 500, that may be used to implement embodiments of the present invention. The system 500 may be implemented in the contexts of the likes of computing systems, networks, servers, or combinations thereof. The system 500 may include one or more processors 510 and memory 520. Memory 520 stores, in part, instructions and data for execution by processor 510. Memory 520 may store the executable code when in operation. The system 500 may further includes a mass storage device 530, portable storage device(s) 540, output devices 550, user input devices 560, a graphics display 570, and peripheral device(s) 580.

The components shown in FIG. 5 are depicted as being connected via a single bus 590. The components may be connected through one or more data transport means. Processor 510 and memory 520 may be connected via a local microprocessor bus, and the mass storage device 530, peripheral device(s) 580, portable storage device 540, and graphics display 570 may be connected via one or more input/output (I/O) buses.

Mass storage device 530, which may be implemented with a magnetic disk drive or an optical disk drive, is a non-volatile storage device for storing data and instructions for use by processor 510. Mass storage device 530 may store the system software for implementing embodiments of the present invention for purposes of loading that software into memory 520.

Portable storage device 540 operates in conjunction with a portable non-volatile storage medium, such as a floppy disk, compact disk, digital video disc, or USB storage device, to input and output data and code to and from the system. The system software for implementing embodiments of the present invention may be stored on such a portable medium and input to the system 500 via the portable storage device 540.

User input devices 560 provide a portion of a user interface. User input devices 560 may include one or more microphones, an alphanumeric keypad, such as a keyboard, for inputting alpha-numeric and other information, or a pointing device, such as a mouse, a trackball, stylus, or cursor direction keys. User input devices 560 may also include a touchscreen. Additionally, the system 500 as shown in FIG. 5 includes output devices 550. Suitable output devices include speakers, printers, network interfaces, and monitors.

Graphics display 570 may include a liquid crystal display (LCD) or other suitable display device. Graphics display 570 receives textual and graphical information, and processes the information for output to the display device.

Peripheral devices 580 may be included and may include any type of computer support device to add additional functionality to the computer system.

The components provided in the system 500 are those typically found in computer systems that may be suitable for use with embodiments of the present invention and are intended to represent a broad category of such computer components that are well known in the art. Thus, the system 500 may be a personal computer, hand held computing system, telephone, mobile computing system, workstation, server, minicomputer, mainframe computer, or any other computing system. The computer may also include different bus configurations, networked platforms, multi-processor platforms, etc. Various operating systems may be used including Unix, Linux, Windows, Mac OS, Palm OS, Android, iOS (known as iPhone OS before June 2010), QNX, and other suitable operating systems.

It is noteworthy that any hardware platform suitable for performing the processing described herein is suitable for use with the embodiments provided herein. Computer-readable storage media refer to any medium or media that participate in providing instructions to a central processing unit (CPU), a processor, a microcontroller, or the like. Such media may take forms including, but not limited to, non-volatile and volatile media such as optical or magnetic disks and dynamic memory, respectively. Common forms of computer-readable storage media include a floppy disk, a flexible disk, a hard disk, magnetic tape, any other magnetic storage medium, a CD-ROM disk, digital video disk (DVD), Blu-ray Disc (BD), any other optical storage medium, RAM, PROM, EPROM, EEPROM, FLASH memory, and/or any other memory chip, module, or cartridge.

Exemplary embodiments of the present technology utilize personas to represent different parties operating with the system. For example, the freight broker is a user of the exemplary web application and a reseller of the exemplary mobile application. The freight broker needs a valuable product to entice carriers/drivers and an intuitive application for reporting and account management. Additionally, the freight broker wants to attract fleets with discounts, provide drivers with a way to pay for fuel, assist drivers to get back on the road fast, and to access transaction data. Furthermore, the freight broker has the following challenges: distributing cards to fleets and drivers; controlling fuel spend for each load; onboarding and offboarding drivers, units, and trailers; updating spend limits for drivers; optimizing routing and fuel costs for fleets and drivers; and avoiding incomplete reporting.

Exemplary systems and methods assist users in avoiding: unapplied discounts, lack of spend controls, drivers going to incorrect truck stops, transaction errors, incomplete reporting, and problems when reimbursing drivers.

Exemplary systems and methods provide: a simple, user-friendly view of a discount network; simple real-time spend controls; a mobile app to load funds to drivers; driver communications in the app; easy overrides; and seamless integration with other office systems.

The exemplary mobile application provides a frictionless payment experience within an application that finds them the ideal truck stop for fueling and other over-the-road necessities.

The exemplary system provides merchants with payments in a frictionless manner with reduced fraud and a payment product that retains loyal driver/customer relationships and provides rich reporting.

A method and system for paying for fuel by carriers, employed drivers, or contracted drivers is also provided.

Trucking companies (also referred to as carriers) purchase fuel from large fueling station networks (also referred to as merchants). Trucking companies typically enable their drivers to pay for fuel using a company credit card or charge card. Trucking companies also often use independent truckers on a regular basis to cover variable requirements and to reduce overhead expenses. It would be advantageous for trucking companies and shippers to be able to pay for fuel directly for employed drivers, independent truckers, and contracted truckers (collectively referred to as drivers or truckers) operating for their benefit, to assist their drivers in obtaining the lowest cost fuel, and to monitor and control fuel expenses. It would also be advantageous for independent truckers and contracted truckers to leverage the group purchasing power of the trucking companies and fuel card network to access discounted fuel and discounted fluids, tires, repairs, parts, and driver amenities.

An exemplary embodiment of the present technology provides a network appliance to a merchant to enable encrypted purchases of fuel by truckers associated with a carrier. The app may guide a driver to an approved merchant, and to an available pump at the merchant. A unique code may be generated and transmitted to the driver by various ways (including displayed at the pump, shown on the mobile app, delivered via SMS or phone call) and input by the driver, or given certain conditions, for instance an RFID or Bluetooth communication from a mobile or wearable device, or an electronic logging device, or using geolocation, or a combination thereof, the driver may bypass the unique code requirement and begin fueling. The transaction includes various data obtained from the driver, the app, and/or an onboard electronic logging system (also referred to as an electronic logging device or ELD). Transaction approval may be provided by a central server system accessing the transaction information, banking information, trip information, and various other data.

An exemplary embodiment of the present technology provides a mobile application (app) for a trucker (driver) to download to a mobile device. The mobile app enables the driver to make secure, contactless payments for fuel and/or other items at a fuel station retail outlet (truck stop) of a fuel station network (merchant). Payments made using the app may benefit from a collective discount from the merchant to a carrier when the driver is hauling a load for the carrier.

The app may access the ELD to obtain hours of service (HOS), work order, odometer reading, fuel level, and other load and trip information. The ELD may be integrated with a transportation management system (TMS). Some information usually associated with a retail fuel purchase by a driver include a driver identifier (also referred to as a driver pin), a trailer identifier, and an odometer reading. Some or all of this information may be obtained directly by the app from the ELD, or queried directly from TMS. The contactless features of the present technology may be implemented by a Bluetooth system, mobile cellular network, WiFi, or any other appropriate communication technology. The present technology may also be implemented via a direct relationship with a credit or debit card issuer to facilitate the discounting of payments. Additionally, location information obtained from a GPS or other location system may be utilized to confirm the truck being fueled is eligible to purchase fuel using the app.

Blockchain technology may be used in the present technology as a ledger of transactions and/or via a point of sale (POS) system at the fueling site.

The steps of the exemplary method for paying for fuel may include:

1. The system acquires a Fuel Merchant and assigns them a Merchant ID as well as distinct IDs for its locations.
2. The system loads location metadata, including GPS coordinates and whitelisted IP addresses and associates with the Merchant ID and location IDs.
3. The system provisions the Fuel Merchant site with a network appliance holding the system-provisioned cryptographic keys and serving a secure proxy to the system's cloud Point Of Sale (POS).
4. The system associates cryptographic keys with Merchant Location ID.
5. The system provisions Carrier with mobile payment application and defines fuel purchasing program details, such as approved locations, required data elements captured with the transaction and settlement details.
6. The system stores fuel discount negotiated between the carrier and the fuel merchant by fuel merchant location.
7. Driver signs into FuelPay application using their existing carrier app credentials (including biometric authentication)
8. The application connects to onboard telematics and HOS (hours of service) tracking software and queries for driver id, trip number, work order and other trip parameters, as well as vehicle information such as odometer reading and fuel level.
9. During the trip, application monitors fuel level and proximity to fuel merchant locations, creating optimal fuel schedule for the trip. Extended optimization includes parking and driver quality of life services, activated by Hours of Service data queried from the vehicle systems.
10. The application navigates the driver to the fueling site and guides to an available pump.
11. Driver confirms the pump number in mobile payment application.
12. The mobile payment application contacts the system cloud host for a unique generated code. Unique code is transmitted to the fuel site where the driver is located and forecourt device controller is instructed to display it to the driver via the pump's payment terminal display.
13. The driver is prompted to enter the code visible on the pump's display. Mobile application submits it to the host for verification.
14. Upon verification, mobile application presents the driver with fueling options (diesel, reefer, DEF).
15. Driver selects transaction options.
16. The mobile payment application creates a list of transaction data including data elements required by the carrier (vehicle id, driver id, odometer reading, work order number, trailer number, estimated gallons to purchase and any additional information) and appends transaction unique code to the list.
17. The mobile payment application contacts the system's cloud payment processing host with the transaction data, cryptographically signed with device specific keys,
18. The system's host verifies the transaction details and approves/declines the transaction.
19. If transaction is approved, the system's host communicates with onsite forecourt device controller to authorize the transaction.
20. Site controller communicates with the dispenser to complete appropriate steps, activating and receiving completion messages from appropriate fuel points (diesel, reefer, def).
21. Pump display guides driver through the steps with appropriate prompts.
22. Once the fueling is complete, site controller submits transaction final data to the system's cloud host.
23. The system's cloud host records the transaction.
24. The system's cloud host transmits transaction data to carriers Transportation Management System.
25. The mobile payment application displays transaction receipt to the driver.
26. Settlement is performed by the payment network (the system's closed loop or other)

A detailed explanation of the problem and the steps in the proposed method according to the exemplary technology. Steps 12 and 13 shown in the slides may alternatively be performed as steps 12a and 13a as follows:

12a: The mobile payment application contacts the system's cloud host for a unique generated code. A unique code is generated and shown on the mobile application interface, the driver is prompted to enter the code on the pump's alphanumeric keypad.
13a. The code entered by the driver is transmitted to the system for verification. Note: Alternatively, these steps may be omitted altogether, if the system infers a high level of confidence of a legitimate driver being present at the pump at the time the transaction is happening A method and system for paying for expenses by carriers, employed drivers, or contracted drivers is also provided.

Trucking companies (also referred to as carriers) reimburse drivers for payments for loading and unloading trucks (referred to as lumper payments), and for other expenses. Trucking companies typically enable their drivers to pay using cash or special certified checks (referred to as com-checks or t-checks). Trucking companies also often use independent truckers on a regular basis to cover variable requirements and to reduce overhead expenses. It would be advantageous for trucking companies to be able to pay for expenses for employed drivers, independent truckers, and contracted truckers (collectively referred to as drivers or truckers) operating for their benefit, to assist their drivers in facilitating on- and off-loading of their trucks without fraud, and to monitor and control expenses, including accessorial expenses. It is further of benefit to the carriers to reduce manual work involved in tracking receipts needed to accurately bill shippers for the expense.

An exemplary embodiment of the present technology provides a mobile application (app) to truckers associated with a carrier. The app may enable a driver to pay a person or contracted company (also referred to as a lumper) to load or unload a truck. The app may also be provided to lumpers for receiving payment. The app may receive information from the driver and/or the lumper to verify the authenticity of the parties, authenticity of the work, the completion of the work, and/or any other suitable information. The app may enable quick or instant access to the funds by the lumper in the form of a credit, a deposit, and/or by payments via the app. Transaction approval may be provided by a central server system accessing the transaction information, banking information, trip information, and various other data.

An exemplary embodiment of the present technology provides a mobile application (app) for a trucker (driver) and or loader (lumper) to download to a mobile device. The mobile app enables the driver or lumper to make and/or receive secure, contactless payments.

Alternatively, the lumper may be provided with a debit card that is recharged automatically via the system when the driver uses the app successfully to pay the lumper for loading and/or unloading services. The app may access an onboard electronic logging system (also referred to as an electronic logging device or ELD) to obtain a work order and a location. The ELD may be integrated with a transportation management system (TMS). Some information usually associated with an expense purchase (for instance a lumper payment) by a driver include a driver identifier (also referred to as a driver pin), a trailer identifier, and a location. Some or all of this information may be obtained directly by the app from the ELD or TMS. The contactless features of the present technology may be implemented by a Bluetooth system, mobile cellular network, WiFi, or any other appropriate communication technology. The present technology may also be implemented via a direct relationship with a credit or debit card issuer to facilitate payments. Additionally, location information obtained from a GPS or other location system may be utilized to confirm the truck being loaded is eligible for payments for loading and/or unloading.

The present technology may also be utilized to pay expenses for a driver associated with a daily, weekly, or other periodic stipend. The stipend payments may be made at specified retailers and/or for specified purchases. Per diem payments up to IRS approved limit may be disbursed to the driver using the present technology. The carrier and the driver may be provided with reports that substantiate expenses and eligibility for the driver using ELD and TMS records for financial accounting and audit purposes.

Lumper payments are payments for unloading of the delivery at the receiver's locations and customarily falls upon the carrier. Typically, the driver delivering the load (owner/operator or employee of a larger carrier) will face a request to engage with a third party about getting unloaded upon delivering the load. This is more typical for refrigerated loads (such as those for grocery chains).

The third-party workforce performing the unloading is referred to as "lumpers". Low penetration or financial services and technology (such as acceptance of open or closed loop cards) is characteristic for this workforce. Another factor is low trust level. Even when card acceptance can be enabled, fraudulent chargebacks have been known to occur for payments from drivers acting in bad faith. A commonly accepted form of payment therefore is cash and a paper form of payment called "comcheck" (similar to personal or cashier's check, with added steps and controls). Both incur significant inconvenience for drivers and room for fraud hurting carriers and shippers.

With either method, the burden remains on the driver to obtain and submit "lumper receipt" for reimbursement from the carrier. Solutions exist to automate this process by using digital photography and image processing. The risks of error correction, reconciliation with financial transactions and delay in recovering funds remain a burden on the carrier.

The system is working on a method to enable fully automated payment and capture data with financial transaction that would facilitate its automated reconciliation and speed up the funds flow.

Such method can include:
1. Issuing an open loop debit cards to lumpers. A driver is provided with a mobile application that upon verification of both parties initiates a payout to the debit card associated with credentialed lumper. At the point of initiation, driver application captures the trip, vehicle, location, driver and other details and transmits them to carrier ERP and accounting systems.
2. A version of the same process where provisioning of the debit card is carried out electronically (such as to a lumper's mobile wallet). Alternatively, an existing digital account (such as paypal) can be collected from the lumper, verified and used for funds transfer.

An exemplary method according to this embodiment of the present technology may include the following steps: a driver requests towing/lumper payment approval; app captures trip, location, vehicle, and driver information; and the system provides a virtual payment card and a payment receipt. The exemplary method may further include a central server system submitting a request to responsible back office personnel for approval (also referred to as an authorization request), the request including trip, driver, location, vehicle, and driver information. The back office may approve the request (also referred to as an authorization approval). The carrier application may then submit a receipt and the back office link may approve the transaction with the service provider, for example the tower or lumper, and provide them with a receipt.

A method and system for paying advances to employed drivers or contracted drivers by carriers is further provided.

Trucking companies (also referred to as carriers) sometimes advance money to drivers for money earned by hauling but which would normally not be paid until the scheduled pay date. Trucking companies also often use independent truckers on a regular basis to cover variable requirements and to reduce overhead expenses. It would be advantageous for trucking companies to be able to advance pay for work performed by employed drivers, independent truckers, and contracted truckers (collectively referred to as drivers or truckers) operating for their benefit, to assist their drivers in paying for personal expenses.

An exemplary embodiment of the present technology provides a mobile application (app) to truckers associated with a carrier. The app may enable a driver to receive pay for work already performed but for which payment would normally not yet be due. The app may access an onboard electronic logging system (also referred to as an electronic logging device or ELD), which may be integrated with a transportation management system (TMS). The ELD may provide Hours of Service (HOS), load history and upcoming loads, odometer readings, and/or location information to the app. Some or all of this information may be obtained directly by the app from the ELD.

The app may receive information from the driver to verify the authenticity of the work, the completion of the work, and/or any other suitable information. The app may enable quick or instant access to funds by the driver in the form of a credit, a deposit, and/or by payments via the app. Transaction approval may be provided by a central server system accessing the transaction information, banking information, trip information, and various other data.

An exemplary embodiment of the present technology provides a mobile application (app) for a trucker (driver) to download to a mobile device, or a software development kit (SDK) that can be incorporated into an existing app. The mobile app enables the driver to receive payments and/or make secure, contactless payments. The contactless features of the present technology may be implemented by a Bluetooth system, mobile cellular network, WiFi, or any other appropriate communication technology. The present technology may also be implemented via a direct relationship with a credit or debit card issuer to facilitate payments. Additionally, location information obtained from a GPS or other location system may be utilized to confirm the driver is eligible for payments for work performed.

ForwardPay

Early wage access for a driver employee may include the following steps:
1. Employee driver creates an account with the exemplary system.
2. The system connects the driver's payroll record with their account.
3. The system connects the driver's record in Transportation Management System (TMS) and Hours of Service (HOS) system with their account.
4. The system connects the driver's financial accounts for funds disbursement to their account.
   a. [optionally] The system opens an account and issues a debit card for the employee driver and their authorized users.
5. The system queries payroll system for the driver's existing taxes, withholdings and garnishments.
6. At an arbitrary point in pay cycle, employee driver accesses their ForwardPay account and is presented with estimated accrued wage balance based on their completed trips data and payroll setup.
7. Employee driver requests an amount up to N % of the accrued balance.
8. Employee driver selects an account to disburse funds into and submits the request.
9. The system funds the account selected by the driver for the amount.
10. The system creates a withholding in the payroll system for the amount provided to the employee driver.
11. The system creates an invoice record to bill the employer (carrier) on a separate cycle, lagging the payroll cycle by several days.
12. The system invoices carrier for a total amount of funds disbursed to drivers for the last closed pay cycle.
13. The system provides carrier with detailed reporting of driver employees accessing their wages, allowing visibility into individual employee's early wage access over time, as well as aggregate by organizational units, geographical regions and other parameters (days into pay cycle, absolute and relative amounts).

A method and system for dynamic retail fuel pricing is additionally provided.

Fuel consumers, both individual and commercial, routinely decide where to purchase motor fuels based on the retailer's posted price of the fuels. It is impractical for retailers to frequently change the posted price multiple times per day or even multiple times per hour. It would be advantageous for retailers to be able to dynamically price fuel to all audiences based on current demand, and it would be advantageous to consumers to gain the benefit of discount fuel during off-peak times.

The exemplary system provides a system platform, proprietary data and algorithms, and additional services. The merchant provides the site, equipment, and certain services. Merchant personnel and consumers/members assist in performing the exemplary methods.

A forecourt controller is connected to the exemplary system platform. Forecourt activity is streamed in real time to a merchant site database of the exemplary system platform.

Optionally, to enable enhanced decisioning, a merchant can additionally opt-in to supplying the merchant site database with the following data:
1. Fuel inventory data from merchant ERP system and/or merchant ATG (Automated Tank Gauge).
2. Fuel WAC (Weighted Average Cost) from merchant ERP or similar system.
3. Fuel replacement cost (rack+contracts) price data.
4. Via the exemplary system Merchant Portal (3) the merchant can configure business rules to ensure the exemplary system platform Utilization Algorithm (2) suits the merchant's individual business needs.

Some of the business rules may include:
1. Do not sell below WAC.
2. Do not discount more than 'n' number of total gallons per 'y' time period.
3. Do not discount if utilization is above 'z' percent over 'x' lookback period.
4. Do not discount low utilization when high utilization isn't possible (such as during overnight hours)

Via the exemplary system Merchant Portal (3) a merchant can disable all or individual sites from the program, thereby temporarily leveraging effective and expiration date and/or time. A merchant can manually override the dynamic algorithm and push out a fixed discount of their choosing (with effective and expiration date and/or time). A merchant can choose to notify (2) app users (4) within a custom defined radius (in miles) of applicable retailer sites.

A merchant may choose to offer this system for fuel pricing via:
1. A subscription based membership program
2. A free, opt-in program such as a Merchant customer loyalty program.

Continually, the system platform Utilization Algorithm (5) calculates the merchant fuel lane utilization rate. Based on the current merchant business rules and merchant fuel lane utilization rate, the system Fuelpay App or Merchant App (4) displays either the full retail price or a discounted (dynamic) fuel price to the Consumer (4). Based on certain conditions such as fuel discount reaching a certain level and/or consumer proximity to a merchant location, a Notification (2) may be triggered and sent to the Consumer's smartphone (4).

Examples of discounts include:
1. Utilization rate—100%; Discount—No discount
2. Utilization rate—75%; Discount—2 cents off per gallon
3. Utilization rate—50%; Discount—10 cents off per gallon
4. Utilization rate—25%; Discount—15 cents off per gallon
5. Utilization rate—0%; Discount—20 cents off per gallon Once savings are accepted by a Consumer (4) the app reflects a loaded savings offer. The Consumer will have a limited time period in minutes within which to complete a fueling transaction after having accepted a savings offer. When a Consumer arrives at the Merchant site and selects a fuel lane within the app, the app will show either the savings, or if the time has expired—the current retail price.

The Consumer's activation of a fuel lane via the App (4) will leverage the system platform's connection to the Merchant Site Forecourt Controller (1) to authorize and prepare the Fuel Lane (1) for fueling without requiring Merchant cashier interaction.

Payment for the fueling transaction will be via either a third party payment instrument the Consumer has stored in the App (4) or via an exemplary system supplied credit instrument. Upon completion of the fueling transaction the Consumer's payment instrument will be billed the net discounted total price of the fueling transaction. The App (4) will show the Consumer their current transaction receipt as well as a history of prior transaction receipts.

The invention claimed is:

1. A method, comprising:
   receiving from a fuel station card reader, at a server, an identifier from a user to authorize a fuel payment at a fuel station having a plurality of fuel pumps;
   associating, by the server, the identifier with a carrier, the carrier being entitled to a fuel discount at the fuel station based on a negotiated fuel purchase agreement;
   receiving, at the server, location information associated with a truck being operated by the user;
   authorizing, by the server, one of the plurality of fuel pumps of the fuel station to provide fuel to the user with the fuel discount only if the location information corresponds to a location at the fuel station associated with the one of the plurality of fuel pumps;
   dispensing, by the one of the plurality of fuel pumps, the fuel to the user with the fuel discount; and
   determining an alternative discount available to the user for the fuel based on a utilization rate of all of the plurality of fuel pumps available at the fuel station, the alternative discount being provided to the user if it is greater than the fuel discount;
   wherein the user is a truck driver contracting with the carrier to haul a load for the carrier;
   wherein the identifier is received at the server from one of a mobile application, a company credit card, a personal credit card, a virtual credit card, and an onboard electronic logging device (ELD);
   wherein the authorizing of the fuel station to provide fuel to the user with the fuel discount is limited by at least one of an amount and a type of fuel; and
   wherein the identifier is received from the user in a secure, contactless, transmission.

2. The method of claim 1, wherein the truck driver is hauling the load for the carrier and the truck is owned by the truck driver.

3. The method of claim 1, further comprising further authorizing other payments at the fuel station.

4. The method of claim 1, wherein:
   the identifier is received at the server from the mobile application;
   the mobile application is downloaded by the user to a mobile device; and
   a driver identifier, a trailer identifier, and an odometer reading are received at the server from the mobile application.

5. The method of claim 1, wherein:
   the identifier is received at the server from the ELD;
   the ELD is integrated with a transportation management system (TMS); and
   a driver identifier, a trailer identifier, and an odometer reading are received at the server from the ELD.

6. The method of claim 1, wherein
   the fuel discount is variable.

7. The method of claim 1, wherein
   the transmission is by one of a Bluetooth system, a mobile cellular network, and a WiFi network.

8. The method of claim 1, wherein the server is one of:
   operated by one of a credit card issuer and a debit card issuer; and
   electronically coupled to a further server operated by one of the credit card issuer and the debit card issuer.

9. The method of claim 1, wherein the alternative discount is not provided when either:
   the utilization rate is above a predetermined amount over a lookback period; and
   during predetermined low utilization periods.

10. A system, comprising:
    a receiver module configured to receive from a fuel station card reader an identifier associated with a user to authorize a fuel payment at a fuel station having a plurality of fuel pumps, the receiver module further configured to receive location information associated with a truck being operated by the user;
    a server configured to receive the identifier from the receiver module and associate the identifier with a carrier, the carrier being entitled to a fuel discount at the fuel station based on a negotiated fuel purchase agreement, the server further configured to authorize one of the plurality of fuel pumps of the fuel station to provide fuel to the user with the fuel discount only if the location information corresponds to a location at the fuel station associated with the one of the plurality of fuel pumps; and
    a forecourt controller configured to receive an authorization from the server to authorize fueling of the user by the one of the plurality of fuel pumps with the fuel discount, the forecourt controller coupled to the plurality of fuel pumps of the fuel station and configured to determine a utilization rate of pumps available at the fuel station, the forecourt controller configured to determine an alternative discount based on the utilization rate, the alternative discount being provided to the user if it is greater than the fuel discount;
    wherein the user is a truck driver contracting with the carrier to haul a load for the carrier;
    wherein the identifier is received at the server from one of a mobile application, a company credit card, a personal credit card, a virtual credit card, and an onboard electronic logging device (ELD);
    wherein the authorizing of the fuel station to provide fuel to the user with the fuel discount is limited by at least one of an amount and a type of fuel; and
    wherein the identifier is received from the user in a secure, contactless, transmission.

11. The system of claim 10, wherein the server authorizes other payments at the fuel station.

12. The system of claim 10, wherein:
    the identifier is received by the receiver module from the mobile application;
    the mobile application is downloaded by the user to a mobile device; and
    a driver identifier, a trailer identifier, and an odometer reading are received at the server from the mobile application.

13. The system of claim 10, wherein:
    the identifier is received at the server from the ELD;
    the ELD is integrated with a transportation management system (TMS); and
    a driver identifier, a trailer identifier, and an odometer reading are received at the server from the ELD.

14. The system of claim 10, wherein the fuel discount is variable.

15. The system of claim 10, wherein the transmission is by one of a Bluetooth system, a mobile cellular network, and a WiFi network.

16. A non-transitory computer-readable medium storing a program for operating a fuel discount sharing application, the program including instructions that, when executed by a processor, causes a processor to:
receive from a fuel station card reader, at a server, an identifier from a user to authorize a fuel payment at a fuel station having a plurality of fuel pumps;
associate, by the server, the identifier with a carrier, the carrier being entitled to a fuel discount at the fuel station based on a negotiated fuel purchase agreement;
receive, at the server, location information associated with a truck being operated by the user;
authorize, by the server, one of the plurality of fuel pumps of the fuel station to provide fuel to the user with the fuel discount only if the location information corresponds to a location at the fuel station associated with the one of the plurality of fuel pumps; and
determine an alternative discount available to the user for the fuel based on a utilization rate of all of the plurality of fuel pumps available at the fuel station, the alternative discount being provided to the user if it is greater than the fuel discount;
wherein the fuel is dispensed, by the one of the plurality of fuel pumps, to the user with one of the fuel discount and the alternative discount;
wherein the user is a truck driver contracting with the carrier to haul a load for the carrier;
wherein the identifier is received at the server from one of a mobile application, a company credit card, a personal credit card, a virtual credit card, and an onboard electronic logging device (ELD);
wherein the authorizing of the fuel station to provide fuel to the user with the fuel discount is limited by at least one of an amount and a type of fuel; and
wherein the identifier is received from the user in a secure, contactless, transmission.

* * * * *